(12) United States Patent
Fraese et al.

(10) Patent No.: US 11,839,924 B2
(45) Date of Patent: Dec. 12, 2023

(54) CUTTING TOOL

(71) Applicant: Kennametal Inc., Latrobe, PA (US)

(72) Inventors: Alex Fraese, Hagenbuechach (DE);
Werner Penkert, Schwanstetten (DE);
Michael Kreuzer, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 112 days.

(21) Appl. No.: 17/065,804

(22) Filed: Oct. 8, 2020

(65) Prior Publication Data

US 2021/0101214 A1 Apr. 8, 2021

(30) Foreign Application Priority Data

Oct. 8, 2019 (DE) .......................... 102019127027.8

(51) Int. Cl.
*B23B 27/10* (2006.01)
*B23C 5/28* (2006.01)
*B23C 5/20* (2006.01)

(52) U.S. Cl.
CPC ................ *B23C 5/28* (2013.01); *B23C 5/205* (2013.01); *B23B 27/10* (2013.01)

(58) Field of Classification Search
CPC ....... B23C 5/28; B23C 5/282; B23C 2210/74; B23C 2210/501; B23C 2250/12; B23B 51/0002; B23B 51/0006; B23B 51/0003; B23B 51/0007; B23B 51/0008; B23B 51/0011
See application file for complete search history.

(56) References Cited

U.S. PATENT DOCUMENTS

| 6,116,825 | A | * | 9/2000 | Kammermeier | ........ B23B 51/06 408/1 R |
| 7,530,769 | B2 | | 5/2009 | Kress et al. | |
| 7,931,425 | B2 | | 4/2011 | Morrison | |
| 7,963,729 | B2 | | 6/2011 | Prichard et al. | |
| 8,534,962 | B2 | * | 9/2013 | Sjoo | .................... B23B 31/1122 407/34 |
| 8,621,964 | B2 | | 1/2014 | Filho | |
| 8,734,069 | B2 | | 5/2014 | Abe et al. | |
| 8,827,598 | B2 | | 9/2014 | Henry et al. | |
| 8,946,585 | B2 | | 2/2015 | Kappmeyer | |

(Continued)

FOREIGN PATENT DOCUMENTS

| CN | 1396847 A | 2/2003 |
| CN | 102717138 | 10/2012 |

(Continued)

OTHER PUBLICATIONS

Jul. 17, 2020-Final Rejection.

(Continued)

*Primary Examiner* — Nicole N Ramos
(74) *Attorney, Agent, or Firm* — Christopher J. Owens

(57) ABSTRACT

The invention relates to a cutting tool, in particular a milling tool, which comprises a tool body on which at least one cutting edge is provided. A coolant supply channel, from which at least one nozzle channel branches off fluidically, extends inside the tool body. The nozzle channel is configured to conduct coolant onto the cutting edge. A flow cross-section of the coolant supply channel is furthermore reduced in one flow direction.

20 Claims, 3 Drawing Sheets

(56) References Cited

U.S. PATENT DOCUMENTS

| | | | |
|---|---|---|---|
| 8,998,543 B2* | 4/2015 | Schwenck | B23G 5/005 72/260 |
| 9,101,985 B2 | 8/2015 | Chen et al. | |
| 9,434,011 B2* | 9/2016 | Morrison | B23Q 11/1076 |
| 9,925,596 B2 | 3/2018 | Johansson et al. | |
| 10,010,948 B1 | 7/2018 | Hayden et al. | |
| 10,029,313 B2 | 7/2018 | Kaufmann | |
| 10,201,862 B2 | 2/2019 | Kachler | |
| 10,335,870 B2 | 7/2019 | Swift et al. | |
| 2002/0009339 A1 | 1/2002 | Arvidsson | |
| 2002/0122698 A1 | 9/2002 | Lagerberg | |
| 2007/0283786 A1 | 12/2007 | Kappmeyer | |
| 2008/0175676 A1 | 7/2008 | Prichard et al. | |
| 2008/0175677 A1 | 7/2008 | Prichard et al. | |
| 2010/0272529 A1* | 10/2010 | Rozzi | B23Q 11/1046 408/56 |
| 2011/0020073 A1 | 1/2011 | Chen et al. | |
| 2011/0305531 A1 | 12/2011 | Amstibovitsky et al. | |
| 2012/0082518 A1 | 4/2012 | Woodruff et al. | |
| 2012/0087746 A1 | 4/2012 | Fang et al. | |
| 2012/0288337 A1* | 11/2012 | Sampath | B23B 51/06 76/108.6 |
| 2013/0129428 A1 | 5/2013 | Henry et al. | |
| 2014/0212225 A1 | 7/2014 | Morrison | |
| 2015/0063926 A1 | 3/2015 | Wu et al. | |
| 2015/0266113 A1 | 9/2015 | Fukata et al. | |
| 2015/0273589 A1* | 10/2015 | Hoffer | B23Q 11/10 407/11 |
| 2015/0328688 A1 | 11/2015 | Johansson et al. | |
| 2015/0328696 A1* | 11/2015 | Wang | B23B 51/06 408/57 |
| 2015/0367429 A1* | 12/2015 | Pearce | B23C 5/10 407/11 |
| 2016/0175938 A1 | 6/2016 | Kaufmann | |
| 2016/0214187 A1 | 7/2016 | Fukata | |
| 2016/0263666 A1* | 9/2016 | Myers | B23C 5/28 |
| 2017/0252839 A1 | 9/2017 | Donisi et al. | |
| 2018/0050397 A1 | 2/2018 | Fraese et al. | |
| 2018/0065196 A1 | 3/2018 | Kachler | |
| 2018/0133809 A1* | 5/2018 | Brunner | B23D 77/006 |
| 2019/0091771 A1* | 3/2019 | Schleicher | B23B 51/06 |
| 2019/0134723 A1 | 5/2019 | Mueller et al. | |
| 2019/0210174 A1* | 7/2019 | Stephenson | B23C 5/28 |
| 2019/0337059 A1* | 11/2019 | Hughey | B23C 5/28 |
| 2021/0114123 A1 | 4/2021 | Fang et al. | |

FOREIGN PATENT DOCUMENTS

| | | |
|---|---|---|
| CN | 103658798 A | 3/2014 |
| CN | 103737091 A | 4/2014 |
| CN | 105252059 A | 1/2016 |
| DE | 102017126931 A1 | 5/2019 |
| JP | 2012200836 A | 10/2012 |
| RU | 2000897 C1 | 10/1993 |
| RU | 2336565 C2 | 10/2008 |
| RU | 150005 U1 | 1/2015 |
| RU | 2548350 C2 | 4/2015 |
| WO | WO2016117461 A1 | 7/2016 |
| WO | WO2016117641 | 7/2016 |

OTHER PUBLICATIONS

Jan. 31, 2020-Non-Final Office Action.
Jan. 22, 2020-Third Party Submission, US App. No. 20190091771A1.
Jun. 17, 2021 Third Party Submission US App. No. 20190091771A1.
Jun. 7, 2021 Notice of Allowance US App. No. 20190091771A1.
Jan. 6, 2021 Office action (3 months) (US Only) US App. No. 20190091771A1.
Nov. 5, 2020 Advisory Action (PTOL-303) 1 US App. No. 20190091771A1.
Dec. 22, 2021 Notice of Allowance RU App. No. 2020132150.
Sep. 6, 2021 Foreign OA RU App. No. 2020132150.
Aug. 31, 2022 Examination notification CN App. No. 112620672A.
Jul. 25, 2022 Office Action (non-US) CN App. No. 109530735A.
Jan. 13, 2023 Foreign Office Action Chinese Application No. CN201810928019.0, 15 Pages.

* cited by examiner

CUTTING TOOL

RELATED APPLICATION DATA

The present application claims priority pursuant to 35 U.S.C. § 119(a) to German Patent Application Number 102019127027.8 filed Oct. 8, 2019 which is incorporated herein by reference in its entirety.

FIELD

The invention relates to a cutting tool, in particular a milling tool, having a tool body on which at least one cutting edge is provided, wherein a coolant supply channel extends inside the tool body.

BACKGROUND

Cutting tools have coolant supply channels are known from the state of the art. The coolant supply channel is usually used to supply a machining zone with coolant.

As a result, a higher machining performance can be achieved than when machining without coolant. Higher metal removal rates can thus be achieved, because the heat generated during machining can be dissipated reliably. Efficient cooling of the machining zone is also of great importance for materials that are difficult to machine in order to ensure a sufficient service life of the cutting edge. Titanium, for example, is a difficult material to machine.

SUMMARY

The underlying object of the invention is therefore to further improve cutting tools of the abovementioned type. The intent is in particular to ensure effective cooling of the machining zone, so that high machining performances can be achieved in conjunction with a long service life of the cutting tool.

The object is achieved by a cutting tool of the abovementioned type, in which at least one nozzle channel branches off fluidically from the coolant supply channel, wherein the nozzle channel is configured to conduct coolant onto the cutting edge, and wherein a flow cross-section of the coolant supply channel is reduced in one flow direction. In this context, nozzle channel refers to a flow channel that comprises a nozzle geometry. Using such a flow channel, coolant can be conducted onto the cutting edge at high speed and also with high precision. This results in effective cooling of the cutting edge and the machining zone. The nozzle channel furthermore allows an efficient, i.e. in particular economical, use of coolant. Because of the targeted application of coolant at high speed, a comparatively large cooling capacity can be guaranteed with a comparatively small amount of coolant. By reducing the flow cross-section of the coolant supply channel, the pressure of the coolant within the coolant supply channel can be adjusted in a targeted manner. In this context, the flow cross-section is to be understood as a flow cross-sectional area. In particular the pressure that is available at the branch of the nozzle channel can thus be selected in a targeted manner. This applies in particular also if a plurality of nozzle channels branch off from the coolant supply channel. The pressure of the coolant can, for example, then be selected such that it is substantially the same at all branches of the nozzle channels. Substantially the same cooling capacity can therefore be provided at all of the cutting edges. This results overall in a uniform cooling of the cutting tool.

In a preferred variant, the cutting tool body is produced using a generative manufacturing process. Such processes also include 3D printing. The geometry of the coolant supply channel and the nozzle channel can thus essentially be freely selected, so that the abovementioned pressures can be adjusted within a wide range.

The cutting tool is preferably a cylindrical cutter, a shell end milling cutter or an end milling cutter.

In one variant, at least two nozzle channels branch off fluidically from the coolant supply channel, in particular wherein the at least two nozzle channels are spaced apart from one another along a tool body central axis. The coolant supply channel thus supplies at least two nozzle channels with coolant, which in turn supply at least two associated cutting edges with coolant. The cutting edges are preferably arranged in different rows of cutting edges, which are spaced apart from one another along the tool body central axis. In this variant, the flow cross-section of the coolant supply channel can in particular be selected such that substantially the same amount of pressure is present at all of the nozzle channels. This results in a uniform cooling of the cutting tool.

The at least one cutting edge can be provided on a cutting insert that is attached to the tool body. Cutting inserts can also be designed as indexable inserts. The cutting edges can thus be quickly replaced as needed by reorienting or replacing the associated cutting inserts.

Preferably, a plurality of nozzle channels and a plurality of cutting edges are provided and each nozzle channel is associated with a single cutting edge in order to conduct coolant onto the associated cutting edge. There is therefore a 1:1 relationship between cutting edges and nozzle channels. This allows the coolant to be conducted onto the cutting edges with high precision. It also ensures efficient use of the coolant. Thus a comparatively small amount of coolant is needed for a given cooling capacity. This also results in high machining performances and long service lives.

The flow cross-section of the coolant supply channel can decrease substantially continuously over the entire extent of the coolant supply channel in the tool body. This means that the coolant supply channel has no abrupt change in cross-section. The continuous cross-sectional reduction is preferably selected such that a flow loss of the coolant, which is expressed as a pressure loss and which results substantially from the length of the coolant supply channel, is compensated. A uniform and reliable cooling of the cutting tool can thus be achieved.

In an alternative, the coolant supply channel extends helically, in particular helically around a tool body central axis or around a parallel to the tool body central axis. The coolant supply channel can thus be located in a region that is comparatively close to the cutting edges. This region is in particular close to a surface of the tool body. If the tool body is cylindrical, the coolant supply channel can therefore be located close to a cylinder jacket. This provides a simple and direct coolant supply to the individual cutting edges. This results in effective and efficient cooling of said cutting edges.

Alternatively or additionally, at least two chip guide grooves can be provided in the tool body, and the coolant supply channel can be arranged circumferentially between the chip guide grooves. Therefore, on the one hand, the coolant supply channel extends in a space-saving manner within the tool body. On the other hand, this ensures a comparatively direct supply of the individual cutting edges with coolant.

In a preferred embodiment, a shell end milling cutter comprises a total of three to ten chip guide grooves, which are arranged helically in the tool body. Three to ten coolant supply channels that extend helically between the chip guide grooves are therefore provided as well.

The at least one nozzle channel advantageously branches off substantially perpendicularly from the coolant supply channel. If the coolant supply channel extends substantially along a tool body central axis, the nozzle channels extend substantially radially with respect to the tool body central axis. This allows the coolant to be conducted reliably onto the cutting edges.

An opening-side end cross-section of the nozzle channel can furthermore be substantially slot-shaped, in particular wherein a slot longitudinal axis extends substantially parallel to the associated cutting edge. Coolant can thus be conducted onto the cutting edge associated with the respective nozzle channel across an entire length of said cutting edge. This results in a reliable and uniform cooling of the cutting edge. The associated service life is thus increased. If a plurality of cutting edges are provided, this preferably applies for all cutting edges. Overall, this then also results in a uniform cooling of the cutting tool.

A plurality of coolant supply channels can also be provided, wherein at least one nozzle channel branches off fluidically from each of the coolant supply channels, in particular wherein all coolant supply channels extend substantially parallel. This is in particular advantageous if the cutting tool comprises a plurality of cutting edges. This also allows comparatively high volume flows of coolant to be used, so that high cooling capacities can be implemented.

According to one embodiment, a coolant supply chamber, from which the coolant supply channels extend fluidically, is provided on a machine-side end of the tool body. The cutting tool is thus centrally supplied with coolant via the coolant supply chamber. In other words, the cutting tool has only one coolant inlet. Starting from the coolant supply chamber, the coolant is conducted into the individual coolant supply channels, i.e. distributed into them. This makes it particularly easy to connect the cutting tool to a coolant supply. The coolant can nonetheless be conducted reliably to every single cutting edge provided on the cutting tool.

BRIEF DESCRIPTION OF THE DRAWINGS

The invention is explained below with the aid of a design example, which is shown in the accompanying drawings. The figures show.

DETAILED DESCRIPTION

Figure 1:
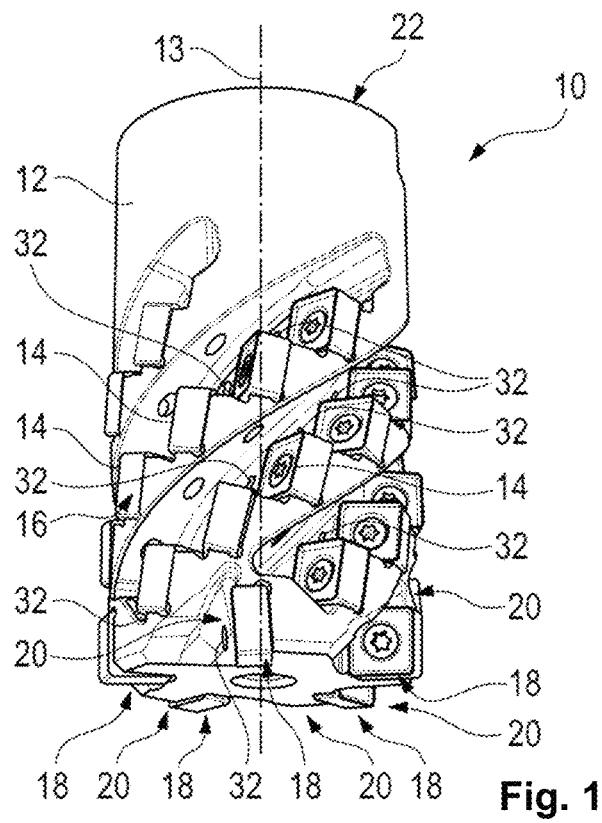
FIG. 1 a cutting tool according to the invention in a perspective view.

FIG. 1 shows a cutting tool 10, which, in the embodiment shown, is a milling tool.

The cutting tool 10 comprises a tool body 12 with a tool body central axis 13, about which it can rotate for the machining of materials. In the embodiment shown, a total of 30 active cutting edges 14 are provided on the tool body 12, of which only a few are provided with a reference sign in FIG. 1 for the sake of clarity.

All of the cutting edges 14 are provided on a respective associated cutting insert 16, which is attached to the tool body 12. Therefore, exactly one active cutting edge 14 is provided by each cutting insert 16. Also of the cutting inserts 16 in FIG. 1, only a few are provided with a reference sign.

The overall 30 cutting inserts 16 are arranged along five, substantially parallel spirals 18 on the periphery of the tool body 12. In other words, the cutting inserts 16 are divided into five groups of six cutting inserts 16, wherein the cutting inserts 16 of each group are positioned on the tool body 12 in a helical manner.

Five chip guide grooves 20 for the reliable removal of chips produced by the cutting edges 14 are provided as well. The chip guide grooves 20 also extend helically.

The tool body 12 is configured to supply the cutting edges 14 with coolant.

Figure 2:
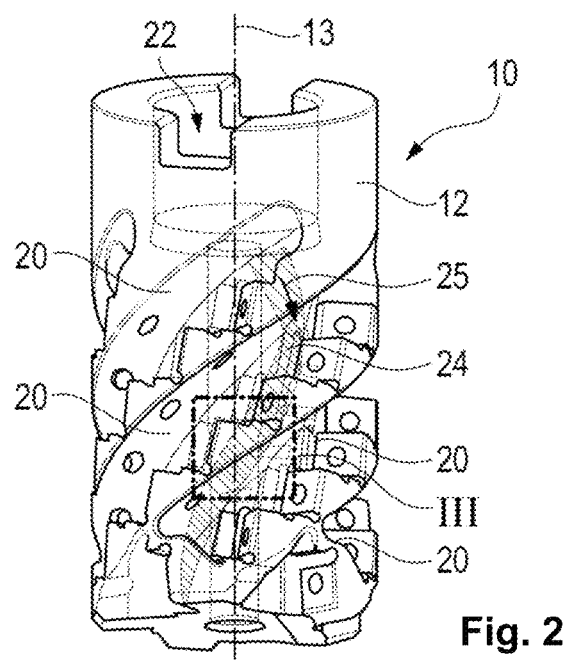
FIG. 2 the cutting tool of FIG. 1 in a partially transparent illustration, whereby no cutting inserts are shown, FIG. 3 a detail III of the cutting tool of FIG. 2, FIG. 4 a longitudinal section through the cutting tool of FIGS. 1 to 3, FIG. 5 an exemplary detail view of the cutting tool of FIGS. 1 to 4, and FIG. 6 another exemplary detail view of the cutting tool of FIGS. 1 to 4.
Figure 4:
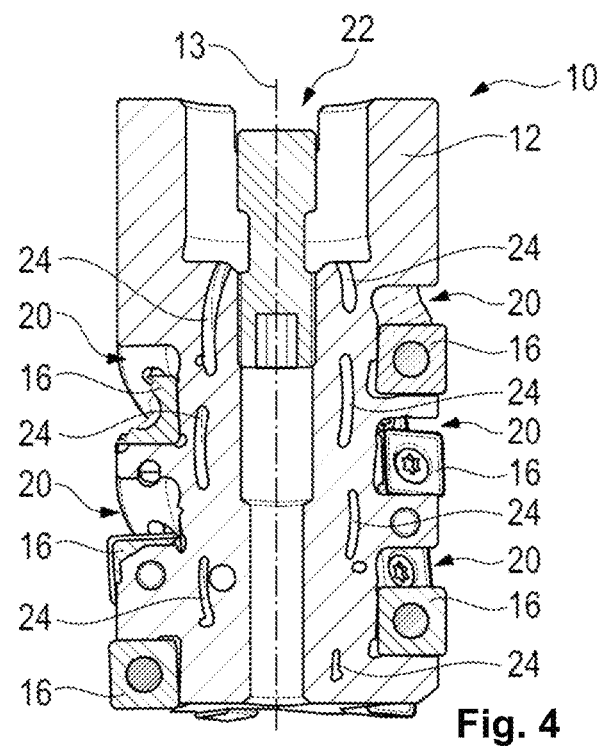

For this purpose, a coolant supply chamber 22 is provided on a machine-side end of the tool body 12, via which the cutting tool 10 can be supplied with coolant (see in particular FIGS. 2 and 4).

Figure 3:
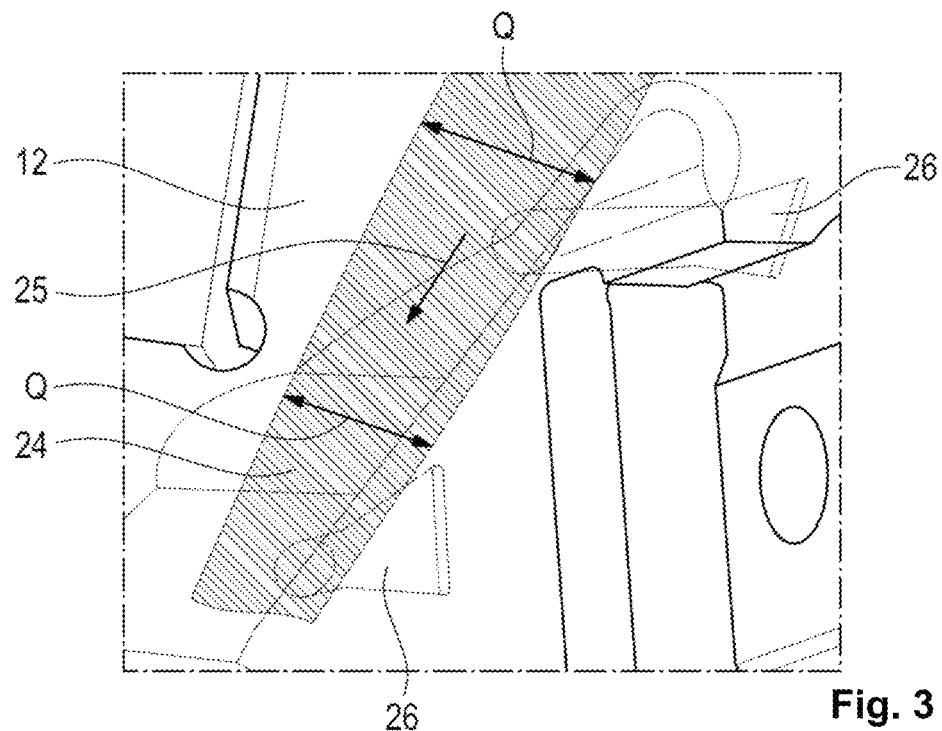

In the design example shown, five coolant supply channels 24 extend from the coolant supply chamber 22 of which only one can be seen in FIGS. 2 and 3.

The coolant supply channels 24 extend substantially parallel to one another.

In the embodiment shown, the coolant supply channels 24 also extend helically with respect to the tool body central axis 13.

They are furthermore respectively arranged circumferentially between two adjacent chip guide grooves 20. Chip guide grooves 20 and coolant supply channels 24 thus alternate on the periphery of the tool body 12.

Each of the coolant supply channels 24 has a flow cross-section Q that decreases continuously along a flow direction 25 of the coolant; here, therefore, starting from the coolant supply chamber 22 toward the cutting edges 14.

Six nozzle channels 26 then branch off fluidically from each of the coolant supply channels 24.

Each nozzle channel 26 is associated with one of the cutting edges 14 in order to conduct coolant onto it. There is therefore a 1:1 relationship between the nozzle channels 26 and the cutting edges 14.

The nozzle channels 26 that branch off from a common coolant supply channel 24 are furthermore spaced apart from one another along the tool body central axis 13.

The distances between the individual nozzle channels 26 are matched to the reduction of the flow cross-section Q of the associated coolant supply channel 24 such that substantially the same pressure prevails at each branch of a nozzle channel 26 from the coolant supply channel 24.

As is evident in particular based on FIGS. 2 and 3, the nozzle channels 26 branch off substantially perpendicularly from the respective associated coolant supply channel 24.

Figure 5:
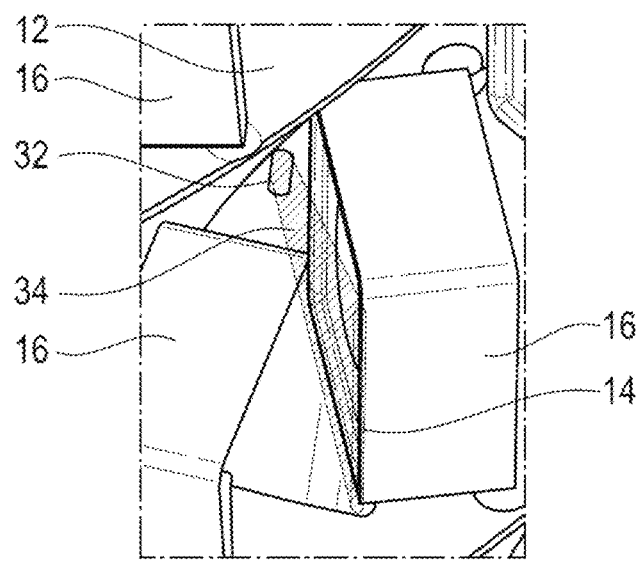
Figure 6:
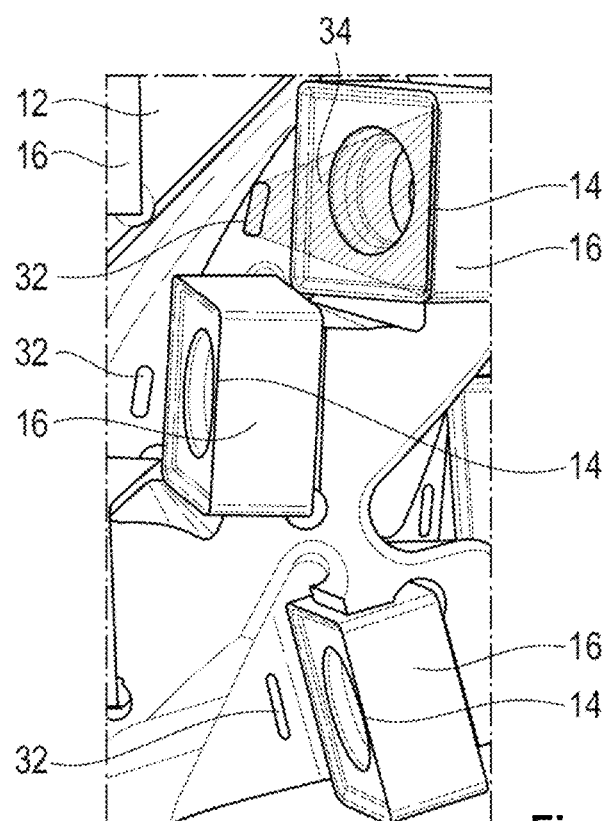

Each nozzle channel 26 also has an opening-side end cross-section 32, which is configured as a rectangular slot in the shown embodiment (see FIGS. 5 and 6). The opening-side end cross-section 32 can, of course, also have a slot-shaped geometry that deviates from a rectangular shape, e.g. curved.

A slot longitudinal axis extends substantially parallel to the associated cutting edge 14.

A coolant jet 34 can thus be directed precisely onto the associated cutting edge 14, so that the entire cutting edge 14 is substantially uniformly supplied with coolant. Ideally, the coolant jet 34 is linear when it hits the cutting edge 14 and is the same length as the cutting edge 14.

The invention claimed is:

1. A cutting tool, comprising:
a tool body having a central axis;
a plurality of cutting edges provided by a plurality of cutting inserts mounted on the tool body;
a coolant supply chamber on a machine-side end of the tool body extending within the tool body;
a plurality of coolant supply channels extending from the coolant supply chamber, each coolant supply channel having a flow cross-section (Q) that reduces with respect to a direction of flow; and
a plurality of nozzle channels branching off from each of the coolant supply channels, each nozzle channel axially separated from an adjacent nozzle channel by a predetermined distance, d, along the central axis of the tool body,
wherein each nozzle channel is associated with a single cutting edge for conducting coolant onto the associated single cutting edge, and
wherein the predetermined distance, d, between each nozzle channel is matched to the reduction of the flow cross-section (Q) of an associated coolant supply channel such that substantially the same coolant pressure is provided at each nozzle channel.

2. The cutting tool according to claim 1, wherein the flow cross-section (Q) of the plurality of coolant supply channels continuously reduces with respect to the direction of flow.

3. The cutting tool according to claim 1, wherein at least two chip guide grooves are provided in the tool body, and the plurality of coolant supply channels is arranged circumferentially between the chip guide grooves.

4. The cutting tool according to claim 1, wherein each nozzle channel branches off substantially perpendicularly from the plurality of coolant supply channels.

5. The cutting tool according to claim 1, wherein an opening-side end cross-section of the nozzle channel is substantially slot-shaped.

6. The cutting tool according to claim 1, wherein each of the coolant supply channels extend helically around the central axis of the tool body.

7. The cutting tool according to claim 5, wherein a longitudinal axis of each opening-side end cross-section extends substantially parallel to the associated cutting edge.

8. The cutting tool according to claim 1, wherein the plurality of coolant supply channels extend substantially parallel to each other.

9. The cutting tool according to claim 1, wherein the cutting tool is a milling tool.

10. A milling cutter, comprising:
a tool body having a central axis;
a plurality of cutting edges provided on the tool body;
a coolant supply chamber on a machine-side end of the tool body extending within the tool body;
a plurality of coolant supply channels extending from the coolant supply chamber, each coolant supply channel having a flow cross-section (Q) that reduces with respect to a direction of flow; and
a plurality of nozzle channels branching off from each of the coolant supply channels, each nozzle channel axially separated from an adjacent nozzle channel by a distance along the central axis of the tool body,
wherein each nozzle channel is associated with a single cutting edge for conducting coolant onto the associated cutting edge, and
wherein the predetermined distance, d, between each nozzle channel is matched to the reduction of the flow cross-section (Q) of an associated coolant supply channel such that substantially the same coolant pressure is provided at each nozzle channel.

11. The milling cutter according to claim 10, wherein the flow cross-section (Q) of the plurality of coolant supply channels continuously reduces with respect to the direction of flow.

12. The milling cutter according to claim 10, wherein at least two chip guide grooves are provided in the tool body, and the plurality of coolant supply channels is arranged circumferentially between the chip guide grooves.

13. The milling cutter according to claim 10, wherein each nozzle channel branches off substantially perpendicularly from the plurality of coolant supply channels.

14. The milling cutter according to claim 10, wherein an opening-side end cross-section of the nozzle channel is substantially slot-shaped.

15. The milling cutter according to claim 14, wherein a longitudinal axis of each opening-side end cross-section extends substantially parallel to the associated cutting edge.

16. The milling cutter according to claim 10, wherein each of the coolant supply channels extend helically around the central axis of the tool body.

17. The milling cutter according to claim 10, wherein the plurality of coolant supply channels extend substantially parallel to each other.

18. The milling cutter according to claim 10, wherein the cutting tool is a milling tool.

19. A milling cutter, comprising:
a tool body having a central axis;
a plurality of cutting edges provided by a plurality of cutting insert mounted on the tool body;
a coolant supply chamber on a machine-side end of the tool body extending within the tool body;
a plurality of coolant supply channels extending from the coolant supply chamber, each coolant supply channel having a flow cross-section (Q) that reduces with respect to a direction of flow; and
a plurality of nozzle channels branching off from each of the coolant supply channels, each nozzle channel axially separated from an adjacent nozzle channel by a distance along the central axis of the tool body,
wherein the predetermined distance, d, between each nozzle channel is matched to the reduction of the flow cross-section (Q) of an associated coolant supply channel such that substantially the same coolant pressure is provided at each nozzle channel.

20. The milling cutter according to claim 19, wherein each nozzle channel is associated with a single cutting edge for providing coolant to the associated single cutting edge.

* * * * *